US005692196A

United States Patent [19]
Unni et al.

[11] Patent Number: 5,692,196
[45] Date of Patent: Nov. 25, 1997

[54] SYSTEM AND METHOD FOR CONDITIONALLY COMPILING A SOFTWARE COMPILATION UNIT

[75] Inventors: Shankar Unni, Campbell; Andrew J. Palay, Mountain View, both of Calif.

[73] Assignee: Silicon Graphics, Inc., Mountain View, Calif.

[21] Appl. No.: 294,823

[22] Filed: Aug. 26, 1994

[51] Int. Cl.$^6$ ........................................ G06F 9/44
[52] U.S. Cl. ................ 395/705; 395/603; 364/226.4; 364/280; 364/280.4
[58] Field of Search ........................ 395/700, 650, 395/705, 708, 603

[56] References Cited

U.S. PATENT DOCUMENTS

| | | | |
|---|---|---|---|
| 4,558,413 | 12/1985 | Schmidt et al. | 364/300 |
| 5,297,284 | 3/1994 | Jones et al. | 395/700 |
| 5,325,531 | 6/1994 | McKeeman | 395/700 |
| 5,325,533 | 6/1994 | McInerney et al. | 395/700 |
| 5,367,683 | 11/1994 | Brett | 395/700 |

OTHER PUBLICATIONS

Palay, Andrew J., "C++ in a Changing Environment", *Usenix Association: C++ Technical Conference*, Silicon Graphics Computer Systems, pp. 195–206.

*Primary Examiner*—Alvin E. Oberley
*Assistant Examiner*—Majid A. Banankhah
*Attorney, Agent, or Firm*—Sterne, Kessler, Goldstein & Fox P.L.L.C.

[57] ABSTRACT

A system and method for conditionally recompiling a compilation unit having a plurality of source code modules operates by selecting one of the source code modules, and determining whether it is necessary to generate a new condensed representation of the selected source code module. A new condensed representation of the selected source code module is generated if such generation is determined as being necessary. Changes between the new condensed representation of the selected source code module and an old condensed representation of the selected source code module are identified. Each of these changes is classified as either a compatible change or an incompatible change. An incompatible change is a change that requires recompilation of the compilation unit. A compatible change is a change that does not require recompilation of the compilation unit. The compilation unit is recompiled if any of the changes is classified as being an incompatible change.

19 Claims, 8 Drawing Sheets

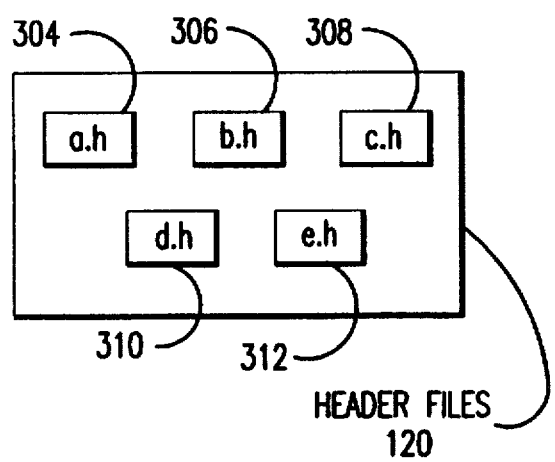
FIG.3B
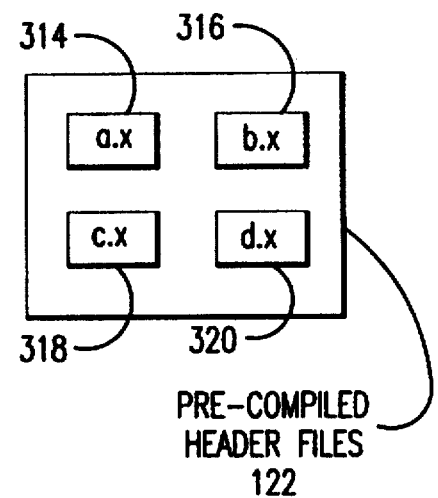
FIG.3C
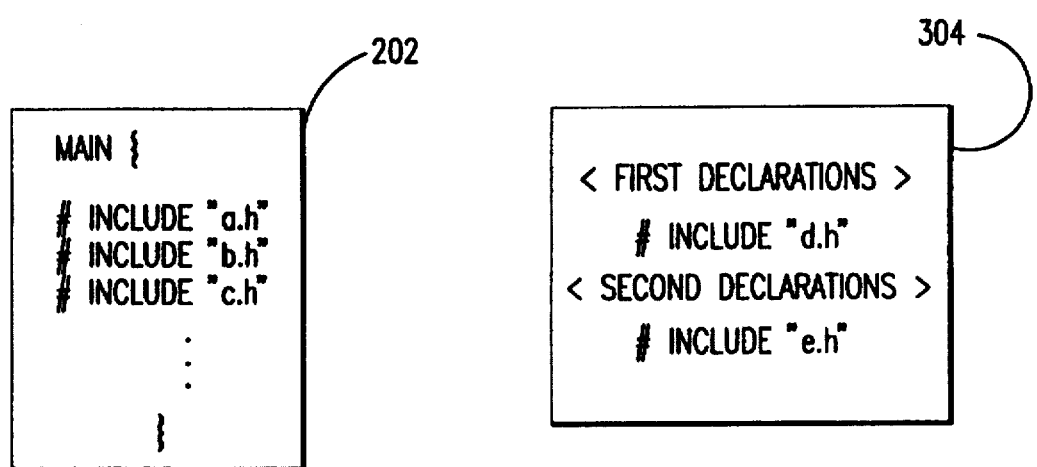
FIG.4
FIG.5

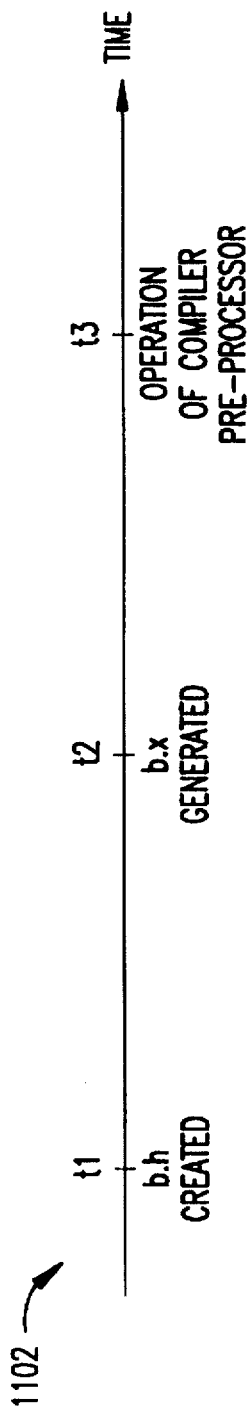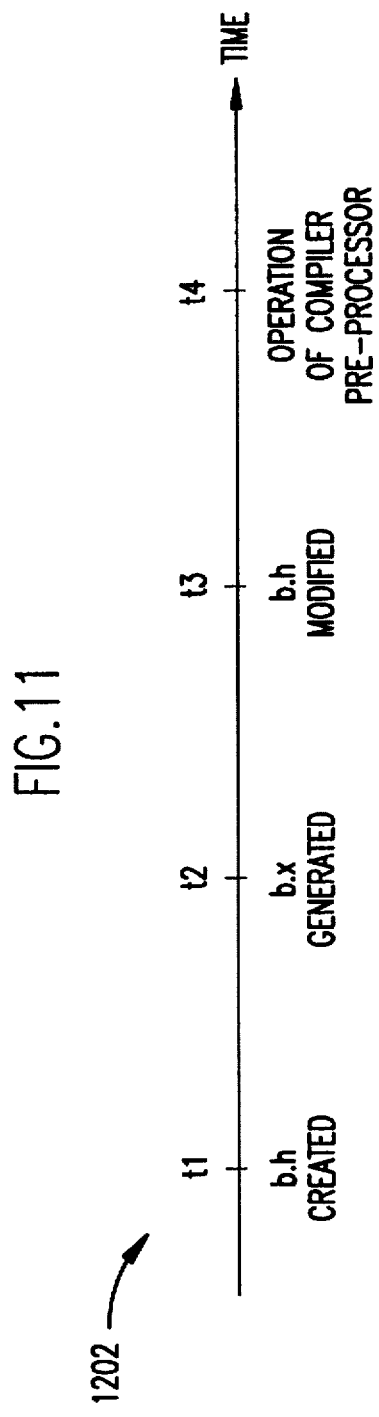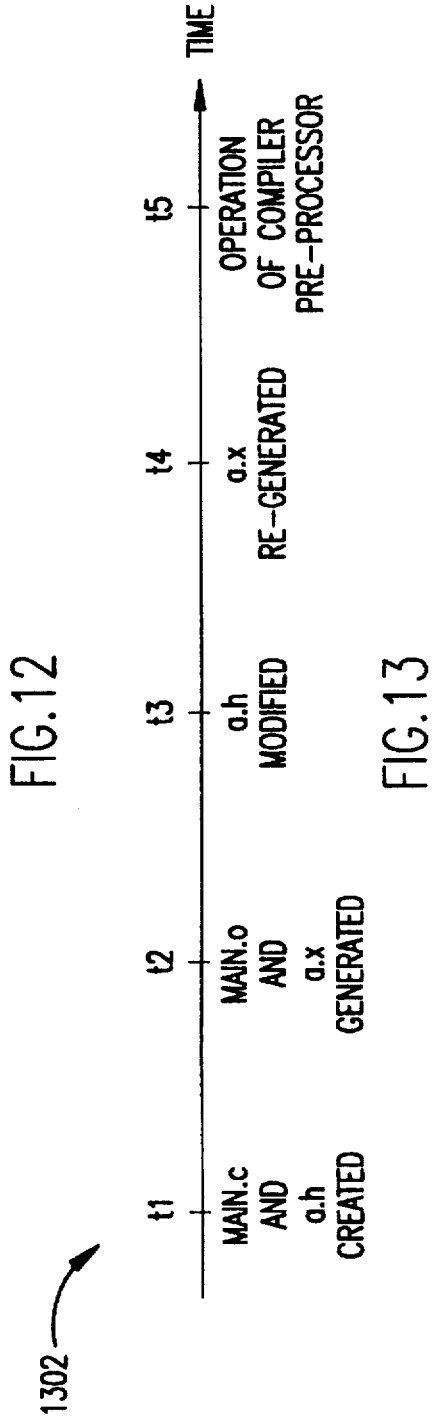

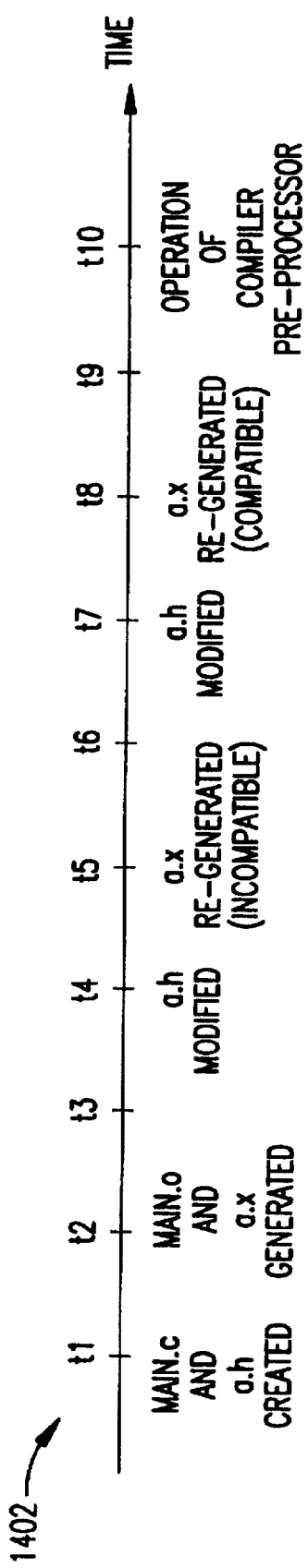

SYSTEM AND METHOD FOR CONDITIONALLY COMPILING A SOFTWARE COMPILATION UNIT

BACKGROUND OF INVENTION

1. Field of the Invention

The present invention relates generally to compiling a compilation unit, and more particularly to recompiling a compilation unit only when components of the compilation unit have changed in incompatible ways.

2. Related Art

A software compilation unit typically includes a "main" software program and one or more header files. Header files are explicitly incorporated into the compilation unit using appropriate software statements located in the "main" program (or located in the header files themselves). For example, in the well known C computer programming language, "include" statements are used to incorporate header files into the compilation unit. For example, the statement:

include "a.h"

is inserted into the "main" program in order to incorporate a header file called "a.h" into the compilation unit. Since they are included in the compilation unit using "include" statements, header files are also called "include files". These terms (i.e., "header files" and "include files") are used interchangeably herein.

Conventionally, the "main" program plus all of its header files are compiled whenever the compilation unit is compiled. The well known UNIX "make" utility operates to compile a compilation unit only when any of its component parts (i.e., the "main" program and/or any of the header files) have changed.

Often, however, it is not necessary to recompile the compilation unit even if one or more of its component parts have changed since the last time the compilation unit was compiled. For example, if only formatting changes have been made to the components of the compilation unit, then it is not necessary to recompile the compilation unit. Conventionally, however, the compilation unit is recompiled whenever any changes are made to its component parts. Thus, conventional compilers perform unnecessary compilation operations. As a result, conventional compilers inefficiently utilize system resources.

SUMMARY OF THE INVENTION

Briefly stated, the present invention is directed to a system and method for conditionally recompiling a compilation unit having a plurality of source code modules. The present invention operates by selecting one of the source code modules, and determining whether it is necessary to generate a new condensed representation of the selected source code module. A new condensed representation of the selected source code module is generated if such generation is determined as being necessary. The present invention then identifies changes between the new condensed representation of the selected source code module and an old condensed representation of the selected source code module. Each of these changes is classified as either a compatible change or an incompatible change. An incompatible change is a change that requires recompilation of the compilation unit. A compatible change is a change that does not require recompilation of the compilation unit. The present invention enables recompilation of the compilation unit only if any of the changes is classified as being an incompatible change.

Further features and advantages of the present invention, as well as the structure and operation of various embodiments of the present invention, are described in detail below with reference to the accompanying drawings. In the drawings, like reference numbers indicate identical or functionally similar elements.

BRIEF DESCRIPTION OF THE FIGURES

The present invention will be described with reference to the accompanying drawings, wherein:

FIGS. 2, 3A–3C, and 4–7 indicate the types of files that may be stored in a storage device of the computer system of FIG. 1, and the preferred formats of such files;

FIGS. 11–14 are timelines used to illustrate the operation of the present invention; and FIG. 15 is a table summarizing the analysis pertaining to the timeline in FIG. 14.

DETAILED DESCRIPTION OF THE PREFERRED EMBODIMENTS

Figure 1:
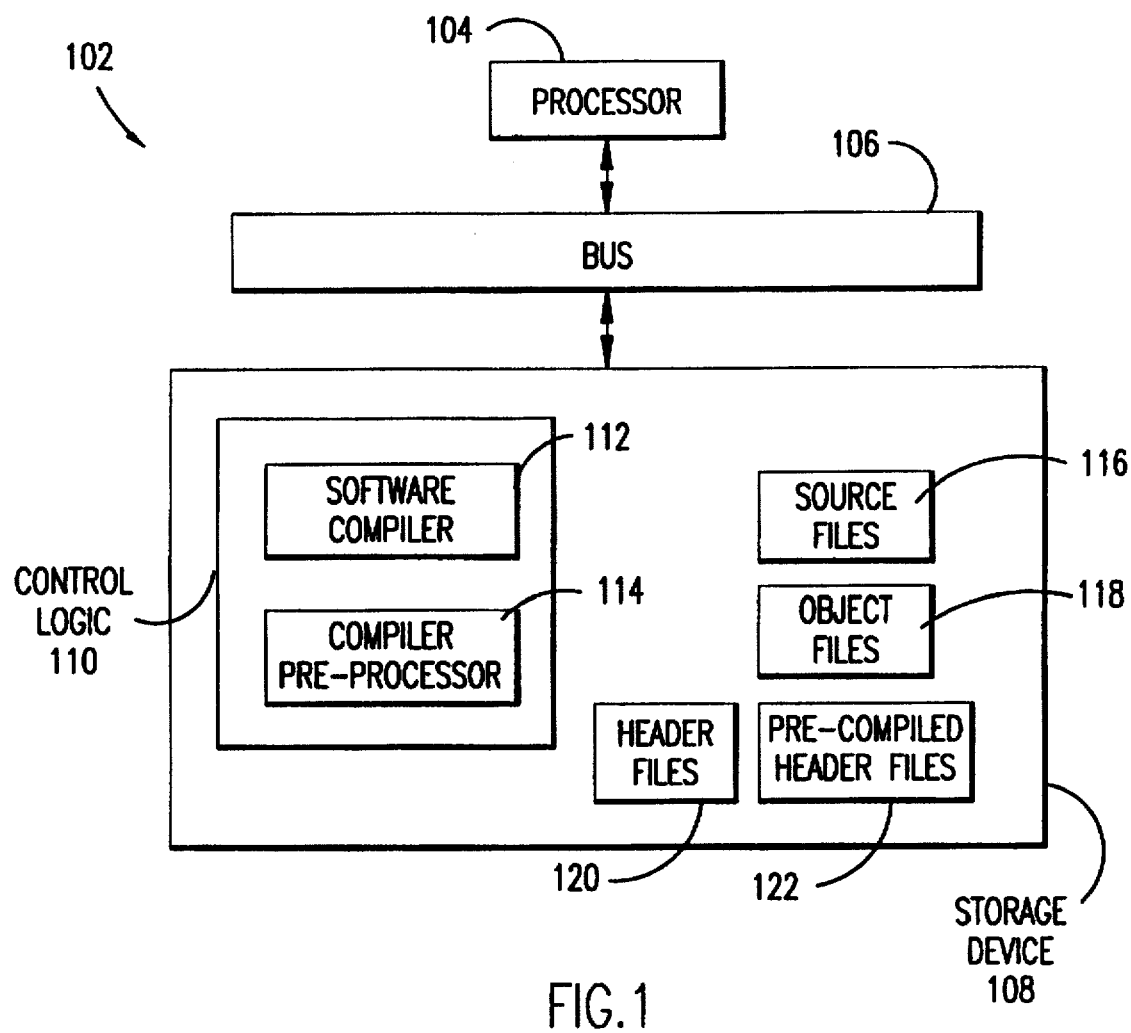
FIG. 1 is a block diagram of a computer system according to a preferred embodiment of the present invention.

FIG. 1 is a block diagram of a computer system 102 according to a preferred embodiment of the present invention. Preferably, the computer system 102 is an Indy Workstation running Irix 5.2 Operating System made by Silicon Graphics, Inc. of Mountain View, Calif., although any other appropriate computer system could alternatively be used. The computer system 102 includes a processor 104 connected to a bus 106. Preferably, the processor 104 is a MIPS R4000-series CPU made by Silicon Graphics, Inc., although any other appropriate CPU could alternatively be used.

Also connected to the bus 106 is a storage device 108, which may represent random access memory (RAM), read only memory (ROM), secondary storage devices (such as hard drives), or any combination of the above.

The processor 104 operates in accordance with control logic 110. Such control logic 110 preferably represents one or more computer programs, such as a software compiler 112 and a compiler pre-processor 114, stored in the storage device 108. Thus, the processor 104 operates in accordance with instructions contained in such computer programs. Such computer programs are preferably written in C, C++, Pascal, and/or Assembler, although any other appropriate computer programming language could alternatively be used.

Note that the software compiler 112 and the compiler pre-processor 114 may represent portions of a single computer program, or may represent distinct computer programs. Also note that the control logic 110 may alternatively be implemented as a hardware state machine.

In one embodiment, the present invention is a computer program product comprising a computer readable media having the control logic 110 recorded thereon. The control logic 110 is loaded into the storage device 108 using any well known means, and executed by the processor 104.

Figure 2:
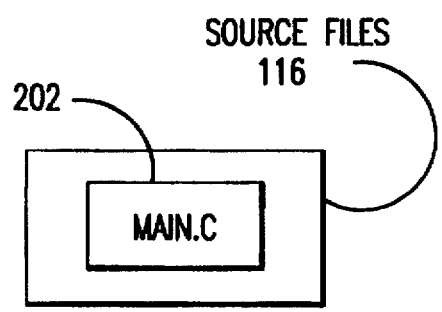

Also stored in the storage device 108 are source files 116. As shown in FIG. 2, the source files 116 may include, for example, a "main" source file 202 (called "main.c" in FIG. 2). A portion of an example "main" source file 202 is shown in FIG. 4 . This example "main" source file 202 includes three "include" statements which operate in a well known manner to incorporate into the "main" source file 202 the code of include files "a.h", "b.h", and "c.h".

Referring again to FIG. 1, the storage device 108 also stores header files 120 (also called include files and source code modules). As shown in FIG. 3B, header files 120 may include "a.h", "b.h", "c.h", "d.h", and "e.h" header files respectively designated by the following reference numbers: 304, 306, 308, 310, and 312. A portion of an example header file, such as the "a.h" header file 304, is shown in FIG. 5. This example "a.h" header file 304 comprises various declaration statements (designated in FIG. 5 as <first declarations>and <second declarations>). This example "a.h" header file 304 also comprises two "include" statements which operate in a well known manner to incorporate into the "a.h" header file 304 the code of "d.h" and "e.h" header files 310 and 312. As will be appreciated, the header files 120 represent source code modules, since they include source code (rather than binary code, for example).

Referring again to FIG. 1, pre-compiled header files 122 are also stored in the storage device 108. As will be appreciated by persons skilled in the relevant art, a pre-compiled header file is a condensed, binary representation of a header file. Preferably, the form of a pre-compiled header file is similar to the form that compilers use to internally represent source statements during compilation. Such pre-compiled header files are faster to read into the compiler than the original header file, since much of the compiler's internal processing for the declarations in the pre-compiled header files has previously been done (when the pre-compiled header file was created). As shown in FIG. 3C, the pre-compiled header files 122 include the "a.x", "b.x", "c.x", and "d.x" pre-compiled header files 314, 316, 318, 320 corresponding to the "a.h", "b.h", "c.h", and "d.h" header files 304, 306, 308, 310, respectively.

Figure 6:
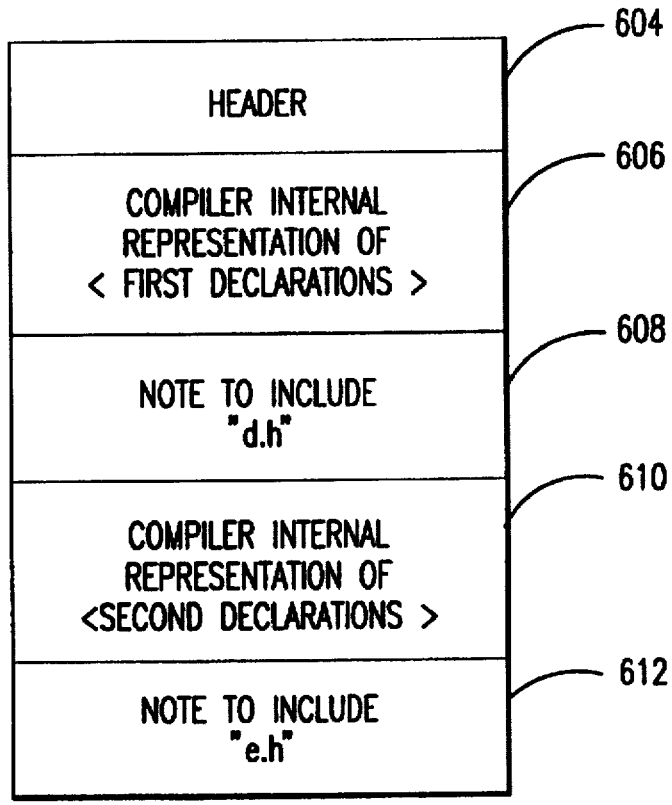

FIG. 6 illustrates an example pre-compiled header file, such as the "a.x" file 314. The "a.x" file 314 includes fields 606 and 610 that contain compiler internal representations of the declarations contained in the "a.h" header file 304 (designated in FIG. 5 as <first declarations >and <second declarations>). The "a.x" file 314 also includes fields 608 and 612 that contain information to enable the inclusion (during the operation of the software linker) of the "d.h" and "e.h" header files 310, 312. The "a.x" file 314 further includes a header field 604. The header field 604 contains historical information pertaining to previous versions of the "a.x" file 314. This header field 604 is discussed in greater detail below.

Figure 3A:
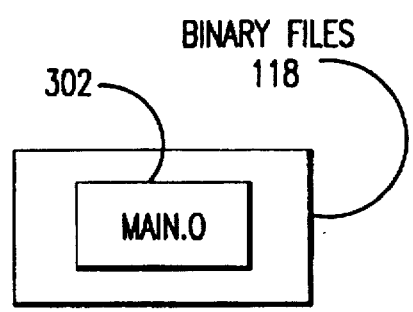

Referring again to FIG. 1, object files 118 are also stored in the storage device 108. An object file is a collection of machine instructions. One or more object files may be linked together to form an executable program. As shown in FIG. 3A, such object files 118 may include a "main" object file 302 (called "main.o" in FIG. 3) which is a compiled, binary version of the "main" source file 202 and its header files.

According to a preferred embodiment of the present invention, the compiler preprocessor 114 and the software compiler 112 operate to compile a compilation unit to generate a compiled, object code version of the compilation unit (i.e., an object file). A software linker (not shown) may then be used to generate in a well known fashion an executable file from the object code version of the compilation unit. The software linker does not form a part of the present invention, and thus shall not be described further. The executable file may be executed by a computer system, such as the computer system 102 shown in FIG. 1.

The operation of the compiler pre-processor 114 and the software compiler 112 shall now be generally described. For illustrative purposes, assume that the compilation unit being compiled includes the following software elements: the "main" source file 202 as shown in FIG. 4 and the "a.h", "b.h", "c.h", "d.h", and "e.h" header files 304, 306, 308, 310, 312 shown in FIG. 3B, where the details of the "a.h" header file 304 are as shown in FIG. 5.

Compilation of this compilation unit generally proceeds as follows. First, the compiler pre-processor 114 analyzes the compilation unit to determine whether it is necessary to recompile the compilation unit. Generally speaking, it is not necessary to recompile the compilation unit if the compilation unit has not changed since the last time that the compilation unit was compiled. Also, according to the present invention, it is not necessary to recompile the compilation unit even if the compilation unit has changed since the last time that the compilation unit was compiled, as long as such changes are "compatible changes". What constitutes "compatible changes" is discussed below.

Then, the compiler 112 compiles the compilation unit if such compilation was deemed to be necessary. The compiler 112 compiles the compilation unit using any well known and appropriate compilation techniques. Such compilation techniques are language specific. For example, if the header files needing compilation are written in the C ++ computer programming language, then the compiler 112 performs its compilation function using any well known compilation techniques appropriate for the C++ computer programming language.

The manner in which the compiler pre-processor 114 analyzes a compilation unit to determine whether it is necessary to re-compile the compilation unit shall now be described with reference to a flowchart 802 shown in FIG. 8. For illustrative purposes, the above example shall be used as appropriate to describe the operation of flowchart 802. Specifically, in the following discussion, it is assumed that the compilation unit being compiled includes the "main" source file 202 as shown in FIG. 4 and the "a.h", "b.h", "c.h", "d.h", and "e.h" header files 304, 306, 308, 310, 312 shown in FIG. 3B, where the details of the "a.h" header file 304 are as shown in FIG. 5. Flowchart 802 begins with step 804, where control immediately passes to step 805.

In step 805, the compiler pre-processor 114 determines whether an object code version (i.e., an object file) of the source file exists. Also, the compiler pre-processor 114 determines whether the source file and the macros referenced therein are unchanged since the last time the compilation unit was compiled. If either (1) an object code version of the source file does not exist, or (2) the source file and/or the macros referenced therein are changed since the last time the compilation unit was compiled, then step 807 is performed wherein the compiler pre-processor 114 sets a recompile flag (described below) to "true". Otherwise, step 806 is performed (described below). In the current example, the compiler pre-processor 114 determines in step 805 that "main.o" 302 (FIG. 3A), which is the object file representation of "main.c" 202 (FIG. 2), exists. Assume that "main.c" 202 and the macros referenced therein are unchanged since the last time "main.c" 202 was compiled. Thus, step 806 is performed.

According to the present invention, a recompile flag is associated with each compilation unit. The recompile flag is preferably maintained in a random access memory (RAM), such as the storage device 108. The recompile flag identifies whether it is necessary to recompile the compilation unit. Specifically, if the recompile flag is set (i.e., set to a value of "1"), then it will be necessary to compile the compilation unit (step 816, described below). If the recompile flag associated with the header file is cleared, then it will not be necessary to compile that header file (step 815, described below).

In step 806, the compiler pre-processor 114 clears (i.e., sets to a value of zero or logical "false") the recompile flag associated with the compilation unit.

In step 808, the compiler pre-processor 114 selects for analysis one of the header files 304, 306, 308, 310, 312 referenced in the compilation unit. Assume, for illustrative purposes, that the "d.h" header file 310 is selected in this step 808.

In step 810, the compiler pre-processor 114 analyzes the header file selected in step 808 (that is, the "d.h" header file 310) to determine whether it is necessary to recompile the compilation unit due to changes in this header file. If the compiler pre-processor 114 determines that it is necessary to recompile the compilation unit, then the pre-processor 114 sets the recompile flag to logical "true". The manner in which the pre-processor 114 performs step 810 is described in detail below.

In step 812, the pre-processor 114 determines whether there are any additional header files 304, 306, 308, 310, 312 to process. Any header files 304, 306, 308, 310, 312 that have been previously selected in step 808 and analyzed in step 810 need not be processed again. If more header files remain to be processed, then control returns to step 808 to select one of the remaining header files.

In step 814, after all of the header files have been processed (as determined in step 812), the pre-processor 114 determines whether the recompile flag (associated with the compilation unit) is set to logical "true". If the recompile flag is not set, then it is not necessary to recompile the compilation unit, as indicated by step 815.

If the recompile flag is set, then the pre-processor 114 in step 816 instructs the compiler 112 to compile the compilation unit.

After performing either step 815 or 816, the operation of flowchart 802 is complete, as indicated by step 818.

Figure 9:
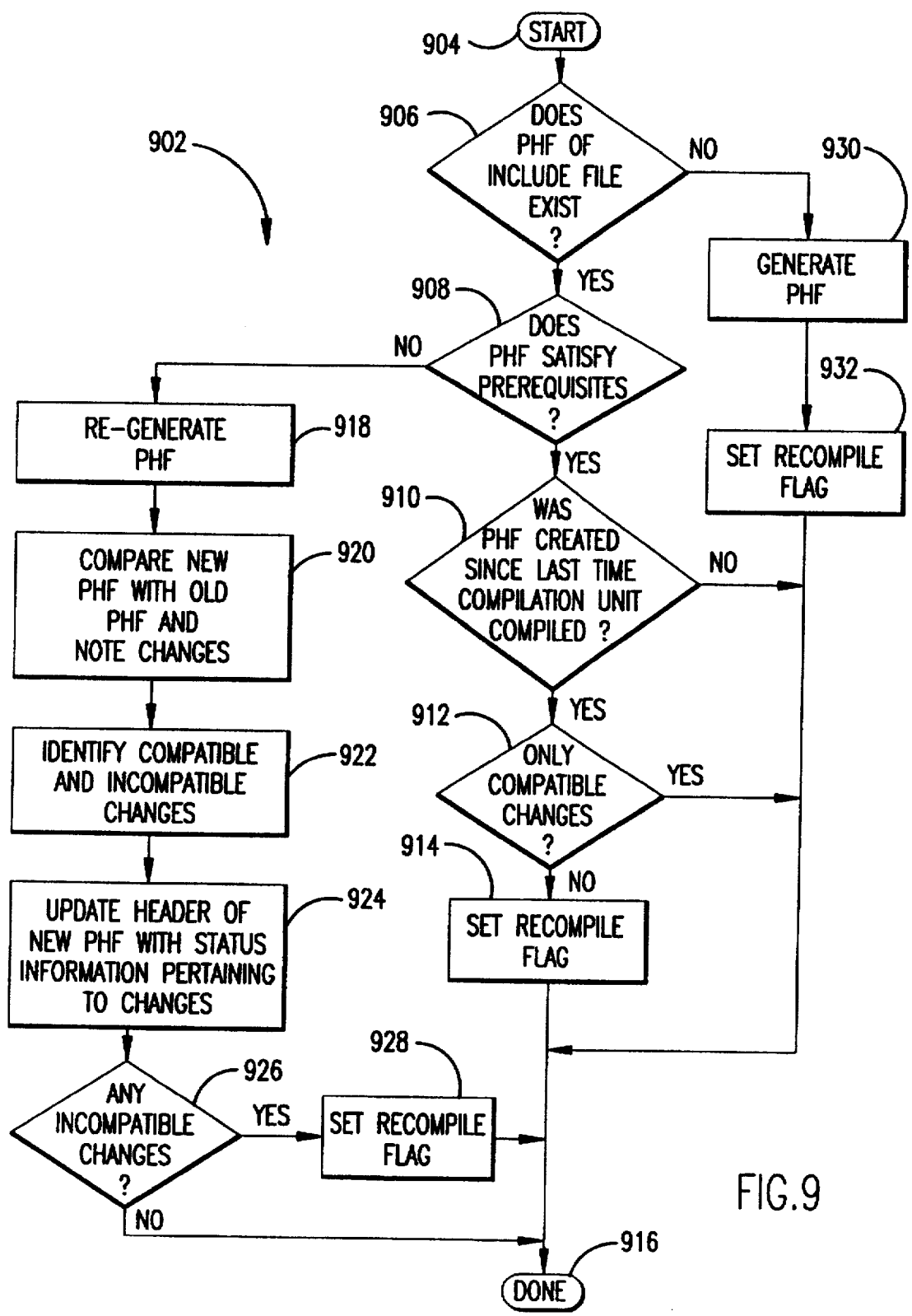

The manner in which the compiler pre-processor 114 in step 810 analyzes the selected header file (that was selected in step 808) shall now be described with reference to a flowchart 902 in FIG. 9. Flowchart 902 represents the operation of the pre-processor 114 when performing step 810. Flowchart 902 begins with step 904, where control immediately passes to step 906.

In step 906, the pre-processor 114 determines whether a pre-compiled header file corresponding to the selected header file exists. If such a pre-compiled header file exists, then step 908 is performed. Otherwise, step 930 is performed.

Figure 8:
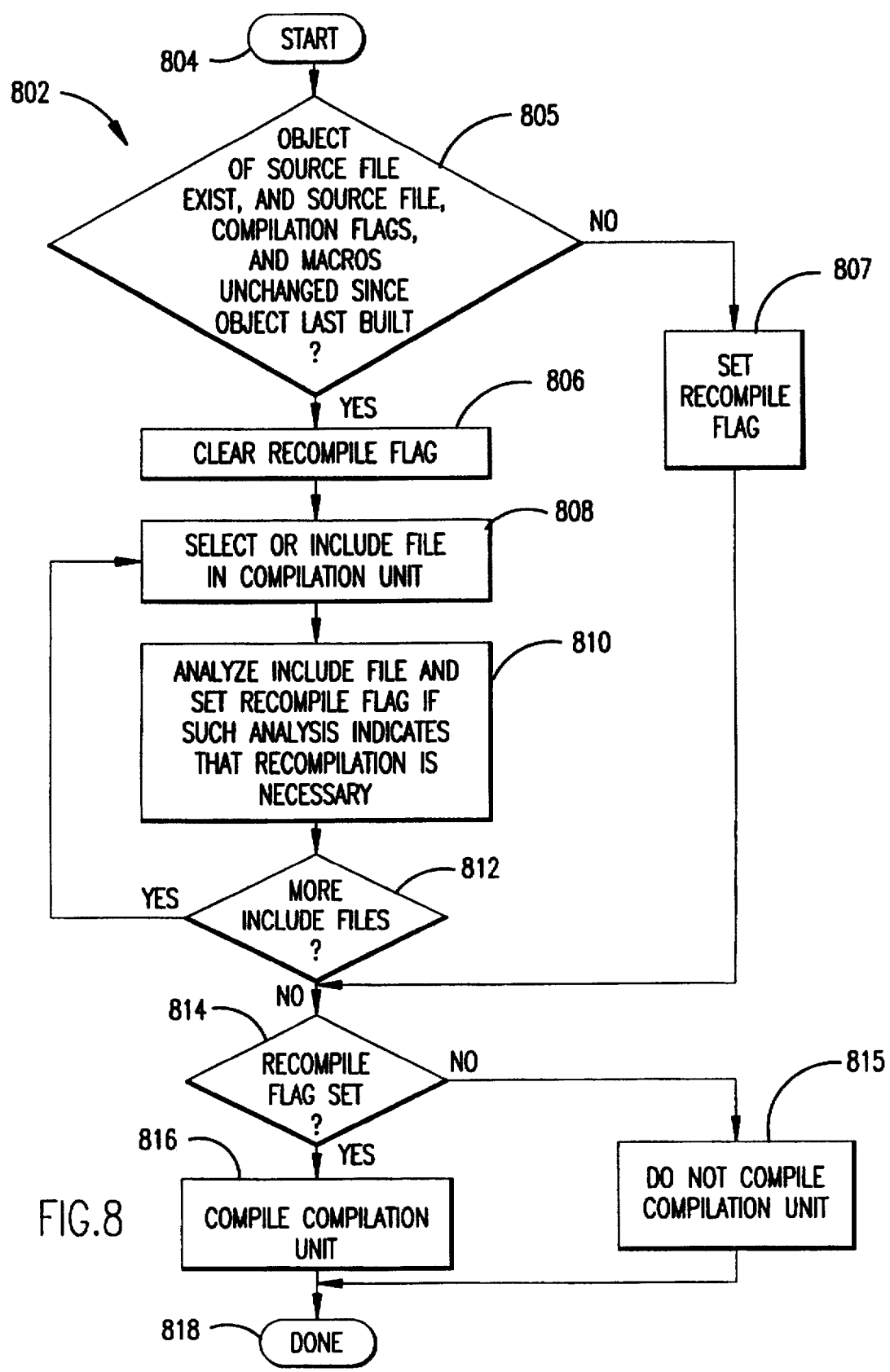
FIGS. 8–10 are flowcharts depicting the preferred operation of the present invention.

Assume, for example, that the "e.h" header file 312 was selected in step 808 (FIG. 8). In this case, the pre-processor 114 in step 906 determines that a pre-compiled header file corresponding to the selected header file (i.e., the "e.h" header file 312) does not exist (see FIG. 3C). Consequently, step 930 is performed. In step 930, the pre-processor 114 causes the compiler 112 to generate a pre-compiled header file (called "e.x") corresponding to the selected header file (i.e., the "e.h" header file 312) using well known, language specific compilation techniques. This new pre-compiled header file is stored with the other pre-compiled header files 122 in the storage device 108. In step 932, the pre-processor 114 sets the recompile flag. After step 932 is performed, the operation of flowchart 902 is complete as indicated by step 916.

Assume, for example, that the "b.h" header file 306 was selected in step 808 (FIG. 8). In this case, the pre-processor 114 in step 906 determines that a pre-compiled header file corresponding to the selected header file (i.e., the "b.h" header file 306) does exist (see FIG. 3C). Consequently, step 908 is performed.

In step 908, the pre-processor 114 determines whether the pre-compiled header file corresponding to the selected header file satisfies a number of predefined prerequisites. If the pre-compiled header file satisfies all of the predefined prerequisites, then it is not necessary to re-generate a pre-compiled header file for the header file. If, instead, the pre-compiled header file does not satisfy all of the pre-defined prerequisites, then it is necessary to re-generate a pre-compiled header file for the header file since the current pre-compiled header file is out-of-date.

Figure 10:
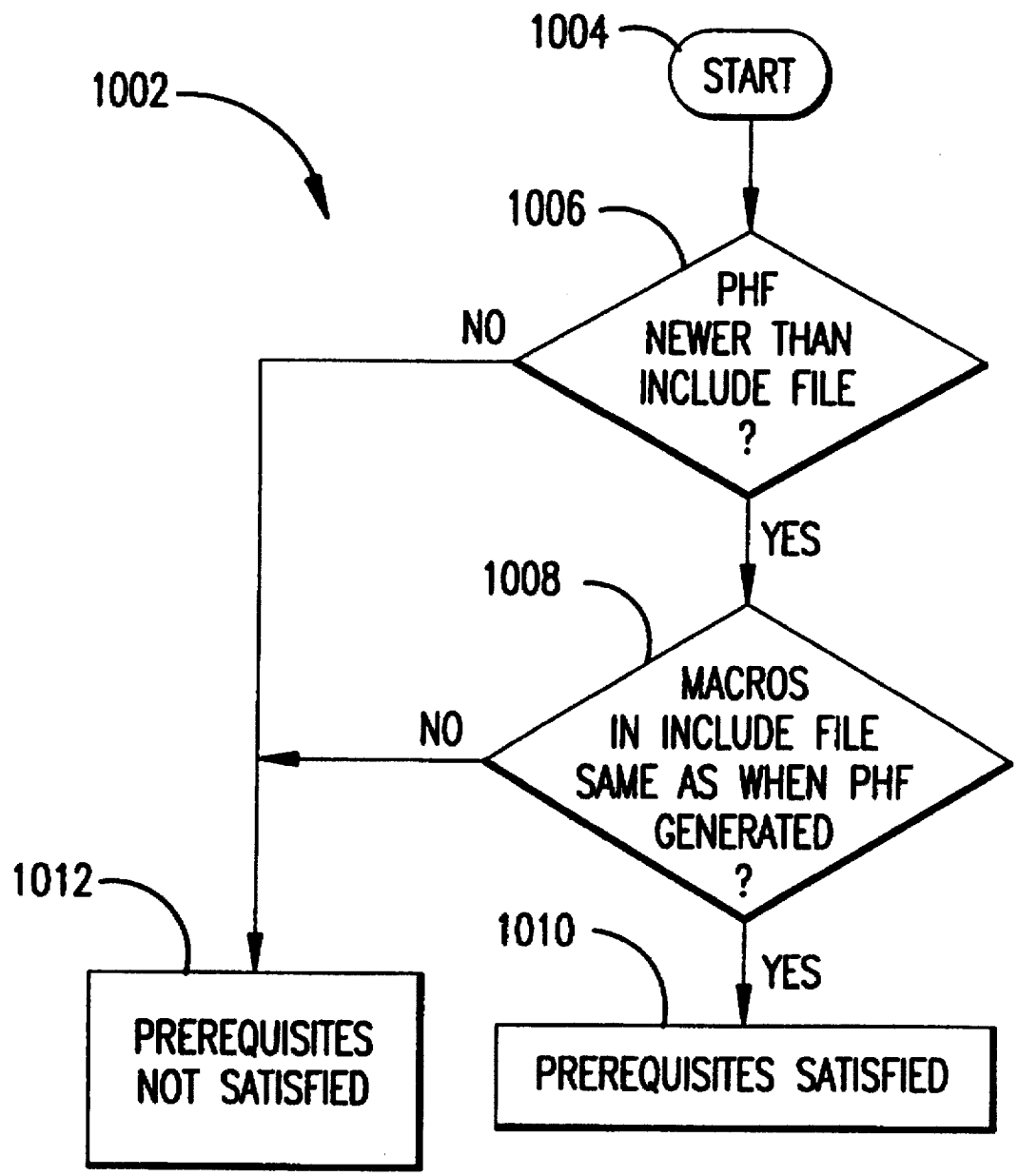

The manner in which the pre-processor 114 performs step 908 is represented by a flowchart 1002 in FIG. 10. This flowchart 1002 begins with step 1004 where control immediately passes to step 1006.

In step 1006, the pre-processor 114 determines whether the pre-compiled header file is newer than the selected header file (that is, whether the date of creation of the pre-compiled header file is more recent in time than the date of creation of the selected header file). In essence, in step 1006 the pre-processor 114 determines whether the selected header file has been modified since the pre-compiled header file was last generated. If the selected header file has been modified since the pre-compiled header file was last generated (i.e., if the pre-compiled header file is not newer than the selected header file), then the pre-processor 114 determines that it is necessary to re-generate a pre-compiled header file for the selected header file. Accordingly, the pre-processor 114 determines that the pre-compiled header file does not satisfy the prerequisites (step 1012). Otherwise, step 1008 is performed to evaluate the pre-compiled header file against the next prerequisite.

The operation of the pre-processor 114 during step 1006 is illustrated by example timelines 1102 and 1202 shown in FIGS. 11 and 12, respectively. Consider first the timeline 1202 shown in FIG. 12. In timeline 1202, the selected header file (the "b.h" header file 306) was created at time t1 and modified at time t3. The corresponding pre-compiled header file (the "b.x" pre-compiled header file 316) was last generated at time t2. The pre-processor 114 performs step 1006 at time t4. With respect to timeline 1202, the pre-processor in step 1006 determines that the pre-compiled header file is not newer than the selected header file. Thus, step 1012 is performed (described above).

In timeline 1102 of FIG. 11, the selected header file (the "b.h" header file 306) was created at time t1. The corresponding pre-compiled header file (the "b.x" pre-compiled header file 316) was last generated at time t2. The pre-processor 114 performs step 1006 at time t3. With respect to timeline 1102, the pre-processor 114 in step 1006 determines that the pre-compiled header file is newer than the selected header file. Thus, step 1008 is performed.

In step 1008, the pre-processor 114 determines whether the macros (if any) contained in the selected header file are the same as when the corresponding pre-compiled header file was last generated. A macro is typically defined as follows:

define macroname expansion tokens or define macroname (parameter,parameter) expansion tokens where expansion tokens represent a collection of tokens (words, symbols, etc.) that are legal in the language that is being compiled. When the compiler 112 sees in the source a word (anywhere subsequent to this definition) that matches one of these macro names, it substitutes the word, and any following parameter lists, with the expansion tokens specified in the macro definitions. Macros are well known to persons skilled in the relevant art.

If the macros contained in the selected header file are not the same as when the corresponding pre-compiled header file was last generated, then the pre-processor 114 determines that it is necessary to re-generate a pre-compiled header file for the selected header file. Accordingly, the pre-processor 114 determines that the pre-compiled header file does not satisfy the prerequisites (step 1012). Alternatively, if the macros contained in the selected header file are the same as when the corresponding pre-compiled header file was last generated, then the pre-processor 114 determines that all of the prerequisites have been satisfied (step 1010).

Referring again to FIG. 9, if the pre-processor 114 in step 908 determines that the pre-compiled header file does not satisfy the prerequisites, then step 918 is performed. In step 918, the pre-processor 114 causes the compiler 112 to re-generate the pre-compiled header file for the selected header file using well known, language specific compilation techniques. This new pre-compiled header file is stored with the other pre-compiled header files 122 in the storage device 108. Such pre-compiled header files 122 also include the old pre-compiled header file (associated with the selected header file) that was analyzed in step 908.

In step 920, the pre-processor 114 compares the new pre-compiled header file with the old pre-compiled header file and notes the changes between the two (such changes reflect the changes in the selected header file since it was last compiled). In step 922, the pre-processor 114 classifies each of these changes as either a compatible change or an incompatible change. An incompatible change is one which requires recompilation of the compilation unit. In other words, if the selected header file contains any incompatible changes, then the compilation unit must be recompiled (i.e., such changes are incompatible with the compilation unit such that the compilation unit must be recompiled). A compatible change is one which does not require recompilation of the compilation unit. In other words, if the selected header file contains only compatible changes and no incompatible changes, then the compilation unit need not be recompiled (i.e., such changes are compatible with the compilation unit such that re-compilation is not necessary).

What qualifies as compatible changes and incompatible changes is programming language specific. For example, in the well known C computer programming language, the following are compatible changes: (1) addition of new types and new declarations of external routines or variables; (2) addition of new macros that do not alter any existing source code in any source or include files; and (3) formatting changes. Generally, the above also represent compatible changes for the well known C++ computer programming language. In the C computer programming language, as in many other languages, the following are incompatible changes: adding a member to a record or to a class (for object oriented languages, such as C++), deleting a member from a record or a class, changing the type of a member of a record or a class, adding a new variable, adding a new data type, modifying an existing data type, and adding a new function. Other compatible and incompatible changes for any particular computer programming language will be apparent to persons skilled in the relevant art.

Figure 7:
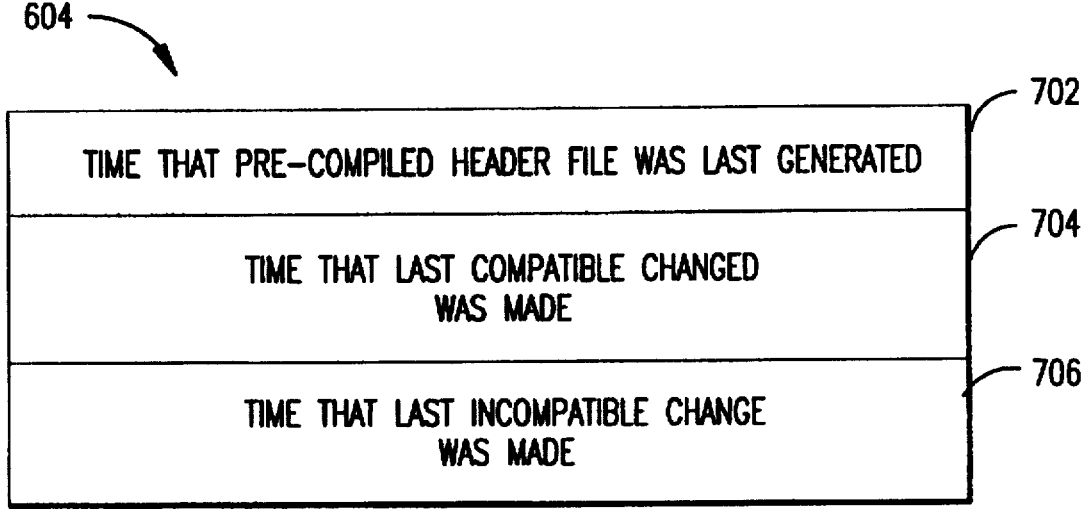

In step 924, the pre-processor 114 updates the header 604 (FIG. 6) of the new pre-compiled header file (generated in step 918) with status information pertaining to the changes identified in step 920 and classified in step 922. The preferred format of the header 604 is shown in FIG. 7. Preferably, in a first field 702 of the header 604, the pre-processor 114 stores the date and time corresponding to when the new pre-compiled header file was generated. In other words, the pre-processor 114 stores in this first field 702 the date and time when step 918 was performed. In a second field 704 of the header 604, the pre-processor 114 stores the date and time corresponding to when the last compatible change was made. For example, if the new pre-compiled header file includes a compatible change, then the date and time corresponding to when the new pre-compiled header file was generated (i.e., the data and time when step 918 was performed) are stored in the second field 704. Alternatively, if the new pre-compiled header file does not include a compatible change, then the pre-processor 114 extracts the date and time information from the second field 704 in the header 604 of the old pre-compiled header file, and stores this information in the second field 704 in the header 604 of the new pre-compiled header file.

In a third field 706 of the header 604, the pre-processor 114 stores the date and time corresponding to when the last incompatible change was made. For example, if the new pre-compiled header file includes an incompatible change, then the date and time corresponding to when the new pre-compiled header file was generated (i.e., the data and time when step 918 was performed) are stored in the third field 706. Alternatively, if the new pre-compiled header file does not include an incompatible change, then the pre-processor 114 extracts the date and time information from the third field 706 in the header 604 of the old pre-compiled header file, and stores this information in the third field 706 in the header 604 of the new pre-compiled header file.

In step 926, the pre-processor 114 determines whether any changes were classified in step 922 as incompatible changes. If no changes were classified as incompatible changes, then operation of flowchart 902 is complete as indicated by step 916. If, instead, one or more changes were classified as incompatible changes, then step 928 is performed. In step 928, the pre-processor 114 sets the recompile flag to logical "true". After step 928 is performed, the operation of flowchart 902 is complete as indicated by step 916.

Refer again to step 908. As discussed above, if the pre-processor 114 in step 908 determines that the pre-compiled header file corresponding to the selected header file satisfies a number of predefined prerequisites, then step 910 is performed.

In step 910, the pre-processor 114 determines whether the pre-compiled header file was created since the last time that the compilation unit was compiled. If the pre-compiled header file was created since the last time that the compilation unit was compiled, then it may be necessary to recompile the compilation unit. Otherwise, it is not necessary to recompile the compilation unit.

Consider, for example, an example timeline 1302 in FIG. 13, and assume that the "a.h" header file 304 was selected in step 808 (FIG. 8). In this timeline 1302, the "main" source file 202 and the "a.h" header file 304 (i.e., the selected header file) were created at time t1 and compiled at time t2. Thus, time t2 represents the last time that the compilation unit was compiled. The "a.h" header file 304 was modified at time t3. The "a.x" pre-compiled header file 314 was regenerated at time t4. The pre-processor 114 performs step 910 at time t5. In this example timeline 1302, the preprocessor 114 would determine in step 910 that the "a.x" pre-compiled header file 314 was created (at time t4) since the last time that the compilation unit was compiled (at time t2).

If the pre-processor 114 in step 910 determines that the pre-compiled header file was not created since the last time that the compilation unit was compiled, then operation of the flowchart 902 is complete, as indicated by step 916. If, instead, the pre-processor 114 determines that the pre-compiled header file was created since the last time that the compilation unit was compiled (as shown in the timeline 1302 of FIG. 13), then step 912 is performed.

In step 912, the pre-processor 114 determines whether only compatible changes have been made to the selected header file since the last time that the compilation unit was compiled. This determination is made by reference to the header 604 (see FIG. 7) of the most recently generated pre-compiled header file associated with the selected header file. If only compatible changes have been made (and no incompatible changes have been made), then it is not necessary to re-compile the compilation unit. If, instead, any incompatible changes have been made, then it is necessary to re-compile the compilation unit.

For example, consider an example timeline 1402 shown in FIG. 14. Also, assume that the "a.h" header file 304 was selected in step 808 (FIG. 8). In this timeline 1402, the "main" source file 202 and the "a.h" header file 304 (i.e., the selected header file) were created at time t1 and compiled at time t2. The "a.h" header file 304 was modified with incompatible changes at time t4. The "a.x" pre-compiled header file 314 was re-generated at time t5. The "a.h" header file 304 was modified with only compatible changes at time t7, and the "a.x" pre-compiled header file 314 was re-generated at time t8. The pre-processor 114 performs step 912 at time t10.

The analysis performed in step 912 is dependent on when the compilation unit was last compiled. If the compilation unit was last compiled at time t3 (or prior to time t3, such as at time t2), then it will be necessary to re-compile the compilation unit. This is the case, since one or more incompatible changes have been made to the "a.h" header file 304 (at time t4) since the last time that the compilation unit was compiled (at time t3).

If the compilation unit was last compiled at time t6, then it will not be necessary to re-compile the compilation unit. This is the case, since only compatible changes have been made to the "a.h" header file 304 (at time t7) since the last time that the compilation unit was compiled (at time t6).

If the compilation unit was last compiled at time t9, then it will not be necessary to re-compile the compilation unit. This is the case, since the "a.x" pre-compiled header file 314 was last created at time t8, and this is before time t9 when the compilation unit was last compiled (see step 910).

The above analysis of timeline 1402 is summarized in a Table 1502 presented in FIG. 15.

If, in step 912, the pre-processor 114 determines that only compatible changes have been made to the selected header file since the last time that the compilation unit was compiled, then operation of flowchart 902 is complete as indicated by step 916. If, instead, the pre-processor 114 determines that one or more incompatible changes have been made to the selected header file since the last time that the compilation unit was compiled, then step 914 is performed. In step 914, the pre-processor 114 sets the recompile flag. After step 914 is performed, the operation of flowchart 902 is complete as indicated by step 916.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method of conditionally recompiling a compilation unit having a plurality of source code modules, comprising the steps of:
   (1) selecting:
       (i) compilation unit having a plurality of source code modules, said source code modules being non-compilation units and being explicitly incorporated into said compilation unit upon a compilation of said compilation unit, and
       (ii) one of said source code modules;
   (2) determining whether it is necessary to generate a new condensed representation of said selected source code module;
   (3) generating a new condensed representation of said selected source code module subject to said determination of step (2);
   (4) identifying changes between said new condensed representation of said selected source code module and an old condensed representation of said selected source code module;
   (5) classifying each of said changes as one of a compatible change and an incompatible change, an incompatible change being a change that requires recompilation of said compilation unit, and a compatible change being a change that does not require recompilation of said compilation unit; and
   (6) enabling recompilation of said compilation unit if any of said changes is classified as being an incompatible change.

2. The method of claim 1, further comprising the step of:
(7) performing steps (1)–(6) for each of said source code modules.

3. The method of claim 1, wherein step (2) comprises the steps of:
   determining whether said old condensed representation is older than said selected source code module; and
   determining that it is necessary to generate a new condensed representation of said selected source code module if it is determined that said old condensed representation is older than said selected source code module.

4. The method of claim 1, wherein step (2) comprises the steps of:
   determining whether macro statements contained in said selected source code module have changed since said old condensed representation was generated; and
   determining that it is necessary to generate a new condensed representation of said selected source code module if it is determined that said macro statements have changed since said old condensed representation was generated.

5. The method of claim 1, wherein steps (5) and (6) comprise the steps of:
   setting to a predefined value a recompile flag associated with said compilation unit if any of said changes is classified as being an incompatible change; and
   enabling compilation of said compilation unit if said recompile flag is set to said predefined value.

6. The method of claim 1, further comprising the following steps which are performed between steps (1)(ii) and (2):

determining whether any condensed representations of said selected source code module exists;

generating a condensed representation of said selected source code module if it is determined that no condensed representations of said selected source code module exists; and enabling compilation of said compilation unit.

7. The method of claim 1, further comprising the following steps which are performed if it is determined in step (2) that it is unnecessary to generate a new condensed representation of said selected source code module:

determining whether said old condensed representation was generated since said compilation unit was last compiled;

if it is determined that said old condensed representation was generated since said compilation unit was last compiled, then determining whether any incompatible changes exist in said old condensed representation relative to a prior version of said old condensed representation; and enabling compilation of said compilation unit only if it is determined that at least one incompatible change exists in said old condensed representation.

8. A system of conditionally recompiling a compilation unit having a plurality of source code modules, comprising:

compilation unit selecting means for selecting a compilation unit having a plurality of source code modules, said source code modules being non-compilation units and being explicitly incorporated into said compilation unit upon a compilation of said compilation unit;

module selecting means for selecting one of said source code modules;

module generation determining means for determining whether it is necessary to generate a new condensed representation of said selected source code module;

condensed representation generating means for generating a new condensed representation of said selected source code module subject to said determination of said module generation determining means;

change identifying means for identifying changes between said new condensed representation of said selected source code module and an old condensed representation of said selected source code module;

change classifying means for classifying each of said changes as one of a compatible change and an incompatible change, an incompatible change being a change that requires recompilation of said compilation unit, and a compatible change being a change that does not require recompilation of said compilation unit; and compilation enabling means for enabling recompilation of said compilation unit if any of said changes is classified as being an incompatible change.

9. The system of claim 8, wherein said module generation determining means comprises:

means for determining whether said old condensed representation is older than said selected source code module; and means for determining that it is necessary to generate a new condensed representation of said selected source code module if it is determined that said old condensed representation is older than said selected source code module.

10. The system of claim 8, wherein said module generation determining means comprises:

means for determining whether macro statements contained in said selected source code module have changed since said old condensed representation was generated; and means for determining that it is necessary to generate a new condensed representation of said selected source code module if it is determined that said macro statements have changed since said old condensed representation was generated.

11. The system of claim 8, wherein said change classifying means comprises means for setting to a predetermined value a recompile flag associated with said compilation unit if any of said changes is classified as being an incompatible change, and wherein said compilation enabling means comprises means for enabling compilation of said compilation unit if said recompile flag is set to said predefined value.

12. The system of claim 8, further comprising:

means for determining whether any condensed representations of said selected source code module exists;

means for generating a condensed representation of said selected source code module if it is determined that no condensed representations of said selected source code module exists; and means for enabling compilation of said compilation unit.

13. The system of claim 8, further comprising:

means for determining whether said old condensed representation was generated since said compilation unit was last compiled if it is determined by said module generation determining means that it is unnecessary to generate a new condensed representation of said selected source code module;

means for determining whether any incompatible changes exist in said old condensed representation relative to a prior version of said old condensed representation if it is determined that said old condensed representation was generated since said compilation unit was last compiled; and means for enabling compilation of said compilation unit only if it is determined that at least one incompatible change exists in said old condensed representation.

14. A compiler pre-processor for determining whether it is necessary to recompile a compilation unit having a plurality of source code modules, comprising:

compilation unit selecting means for selecting a compilation unit having a plurality of source to code modules, said source code modules being non-compilation units and being explicitly incorporated into said compilation unit upon a compilation of said compilation unit;

module selecting means for selecting one of said source code modules;

module generation determining means for determining whether it is necessary to generate a new condensed representation of said selected source code module;

condensed representation generating means for generating a new condensed representation of said selected source code module subject to said determination of said module generation determining means;

change identifying means for identifying changes between said new condensed representation of said selected source code module and an old condensed representation of said selected source code module;

change classifying means for classifying each of said changes as one of a compatible change and an incompatible change, an incompatible change being a change that requires recompilation of said compilation unit, and a compatible change being a change that does not require recompilation of said compilation unit; and compilation enabling means for enabling recompilation of said compilation unit if any of said changes is classified as being an incompatible change.

15. The compiler pre-processor of claim 14, wherein said module generation determining means comprises:

means for determining whether said old condensed representation is older than said selected source code module; and means for determining that it is necessary to generate a new condensed representation of said selected source code module if it is determined that said old condensed representation is older than said selected source code module.

16. The compiler pre-processor of claim 14, wherein said module generation determining means comprises:

means for determining whether macro statements contained in said selected source code module have changed since said old condensed representation was generated; and means for determining that it is necessary to generate a new condensed representation of said selected source code module if it is determined that said macro statements have changed since said old condensed representation was generated.

17. The compiler pre-processor of claim 14, wherein said change classifying means comprises means for setting to a predefined value a recompile flag associated with said compilation unit if any of said changes is classified as being an incompatible change, and wherein said compilation enabling means comprises means for enabling compilation of said compilation unit if said recompile flag is set to said predefined value.

18. The compiler pre-processor of claim 14, further comprising:

means for determining whether any condensed representations of said selected source code module exists;

means for generating a condensed representation of said selected source code module if it is determined that no condensed representations of said selected source code module exists; and means for enabling compilation of said compilation unit.

19. The compiler pre-processor of claim 14, further comprising:

means for determining whether said old condensed representation was generated since said compilation unit was last compiled if it is determined by said module generation determining means that it is unnecessary to generate a new condensed representation of said selected source code module;

means for determining whether any incompatible changes exist in said old condensed representation relative to a prior version of said old condensed representation if it is determined that said old condensed representation was generated since said compilation unit was last compiled; and means for enabling compilation of said compilation unit only if it is determined that at least one incompatible change exists in said old condensed representation.

* * * * *